UNITED STATES PATENT OFFICE.

CHARLES F. BROADBENT, OF BALTIMORE, MARYLAND, ASSIGNOR TO LUBRICATING MATERIAL AND OIL COMPANY, OF SAME PLACE.

LUBRICATING COMPOSITION.

SPECIFICATION forming part of Letters Patent No. 233,197, dated October 12, 1880.

Application filed May 12, 1880. (No specimen.)

*To all whom it may concern:*

Be it known that I, CHARLES F. BROADBENT, of Baltimore, in the county of Baltimore and State of Maryland, have invented a new and useful Improvement in Lubricating Mixtures; and I do hereby declare that the following is a full and exact description of the same.

My invention consists in a composition intended to be mixed with animal, mineral, or vegetable oils, and the mixture thus prepared to be used as a lubricant for machinery, which composition is prepared as follows, the proportions and quantities being for forty gallons: Taking some suitable vessel—as, for instance, a forty-gallon barrel—I put into the same twenty-five ounces of quicklime, then pour in upon the same boiling or hot water sufficient to cover the quicklime to the depth of three or four inches, which slakes and dissolves the lime and converts it into milk of lime. I then add to the milk of lime in the barrel ten ounces of precipitated chalk and stir the mixture thoroughly. I then add eight ounces of sal-soda to the mixture in the barrel and stir the same thoroughly for about ten minutes. I then fill the barrel with cold water and stir the contents thoroughly for ten or fifteen minutes. I then cover the barrel closely and let it stand for several hours—twelve hours being about the longest time required—when the composition will be ready for use. This composition thus prepared can be mixed with any animal, mineral, or vegetable oil in equal proportions of each, which proportions I have found usually to be the best, although these proportions may be varied to advantage, as experience may dictate, using one part of the composition to two parts of oil, or two parts of the composition to one of oil, and between these limits.

Before mixing my composition with the oil the composition must be thoroughly stirred and the oil poured slowly into it and both stirred together until thoroughly mixed, when it will have the consistency of cream. After the composition has been mixed with the oil there will be found scarcely any precipitation or separation of component parts by gravity; but it will be well to give the lubricant thus made a little shaking or stirring every two or three days, if the same is contained in a large vessel—as, for instance, a barrel, as is commonly used.

The advantages which I believe my composition to possess are as follows—viz: It is very cheap and easily made, and will keep without change for a long time. When added, as described, to oils it produces a lubricant which is more durable than an equal quantity of the same oil, while it keeps the frictional parts of machinery cooler than any oil.

My lubricant thus produced has no destructive grit, will not gum, nor will it oxidize the metals it comes in contact with.

I do not wish to be confined to the specific quantities of the various materials used in my mixture, as the same may be varied within reasonable limits without departing from the spirit of my invention.

Having thus described my invention and stated some of its advantages, what I claim as new therein, for which I wish the protection of Letters Patent, is—

A lubricating mixture consisting of milk of lime, precipitated chalk, sal-soda, and water, in the proportions and for the purposes substantially as described.

This specification signed and witnessed this 12th day of May, 1880.

CHAS. F. BROADBENT.

Witnesses:
JOHN C. SCHROEDER,
JAMES A. PAYNE.